United States Patent

Kreuzer et al.

Patent Number: 5,282,182
Date of Patent: Jan. 25, 1994

[54] VIDEO MONITOR AND HOUSING ASSEMBLY

[76] Inventors: Monroe E. Kreuzer, P.O. Box 1057; John E. Fox, Rte. 1, Box 328, both of Anahuac, Tex. 77514

[21] Appl. No.: 789,883

[22] Filed: Nov. 12, 1991

[51] Int. Cl.$^5$ .......................... H04N 5/26; H04N 5/76
[52] U.S. Cl. ...................... 369/021; 354/81; 358/108
[58] Field of Search .................... 369/21, 12; 206/335, 206/387, 486, 316.1, 316.2; 224/908, 273, 315; 358/108, 229, 107; 354/81, 293; 360/5

[56] References Cited

U.S. PATENT DOCUMENTS

| | | | |
|---|---|---|---|
| 1,733,783 | 10/1929 | Medina | 354/81 |
| 3,752,047 | 8/1973 | Gordon et al. | 354/81 X |
| 3,993,866 | 11/1976 | Pearl et al. | 354/81 X |
| 4,160,999 | 7/1979 | Claggett | 354/81 X |
| 4,534,632 | 8/1985 | Laviolette | 354/81 |
| 4,789,904 | 12/1988 | Peterson | 360/5 X |
| 4,843,463 | 6/1989 | Michetti | 360/5 X |
| 4,881,135 | 11/1989 | Heilweil | 358/108 X |
| 5,012,335 | 4/1991 | Cohodar | 354/81 X |

Primary Examiner—Robert S. Tupper
Assistant Examiner—Joseph A. Rhoa
Attorney, Agent, or Firm—Richard C. Litman

[57] ABSTRACT

A portable video cassette camera or minicam, preferably a palmcorder, is placed within a vehicle so as to monitor the activity within the passenger compartment. The minicam is contained in a box fastened to a wall within the vehicle so as to prevent the theft of the minicam. The minicam is mounted on a base adapted to fit snugly inside the box, the door of the box is opened, the base and minicam are placed inside the box once the minicam is set to record, and the door is closed. The minicam records the activity occurring in the passenger compartment through a solar cool glass window located in the door of the box.

7 Claims, 2 Drawing Sheets

VIDEO MONITOR AND HOUSING ASSEMBLY

BACKGROUND OF THE INVENTION

1. Field of the Invention

This invention relates to the use of camera monitors for surveillance. More particularly, it relates to the use of video cassette recorders (VCRs) or camcorders to record activity by a user when the user is absent from the location to be monitored. The user may monitor the activity which occurred during his/her absence by playing back the cassette at a later time.

2. Description of the Prior Art

In public places where people gather it is often desirable to place monitoring devices so as to detect and in some cases record any improper activity which may occur. For example, some banks use cameras to record and monitor the lobby in the event of a robbery. Likewise, some industrial plants use cameras placed in employee parking lots or employee break rooms to detect improper activities such as thefts or fights.

U.S. Pat. No. 4,855,823 issued Aug. 8, 1989 to Kenneth E. Struhs et al discloses a monitoring system remotely and robotically controlling the camera including the control of the lens system, the direction of the camera's field of view, and the mounting of the camera.

U.S. Pat. No. 3,175,037 issued Mar. 23, 1965 to Howard R. Padgitt discloses a television lens system with a wide viewing angle.

U.S. Pat. No. 4,899,231 issued Feb. 6, 1990 to Masaya Maeda et al discloses a video recorder system of reduced size and weight.

U.S. Pat. No. 4,978,984 issued Dec. 18, 1990 to Richard A. Brookfield discloses a surveillance apparatus installed in the air vent of a motor vehicle.

None of the above disclosures teach the use of a box mounted in a vehicle which can be opened to place a VCR/camcorder therein when the passenger compartment is to be monitored. After the monitoring is completed, the monitoring device can be easily removed as disclosed by the present invention. This feature is not demonstrated in the prior art.

SUMMARY OF THE INVENTION

Accordingly one object of the present invention is to provide a box within the passenger compartment of a vehicle so that a VCR/camcorder may be placed therein when monitoring of the activity in the vehicle is desired and removed any other time.

Another object of the present invention is to provide a solar cool glass window on the door of the box so as to allow monitoring of the compartment by the VCR/camcorder when the door of the box is closed while not allowing anyone to see into the box. The solar cool glass will further reduce any glare the VCR/camcorder may pick up while recording, for example, from the sun shining through the windows of the compartment.

Still another object of the present invention is to provide mounting means for the VCR/camera to prevent movement of the camera within the box as monitoring of the compartment is taking place.

The present invention provides for a box mounted within the passenger compartment of a vehicle to house a VCR/camcorder. The video camera is turned on to record the activities transpiring within the vehicle as the vehicle is in operation. During this time the door of the box is closed and locked to prevent anyone from tampering with the video camera. The recorded information is later reviewed to detect any improper behavior by the driver of the vehicle or the passengers.

DETAILED DESCRIPTION OF THE PREFERRED EMBODIMENTS

Figure 1:
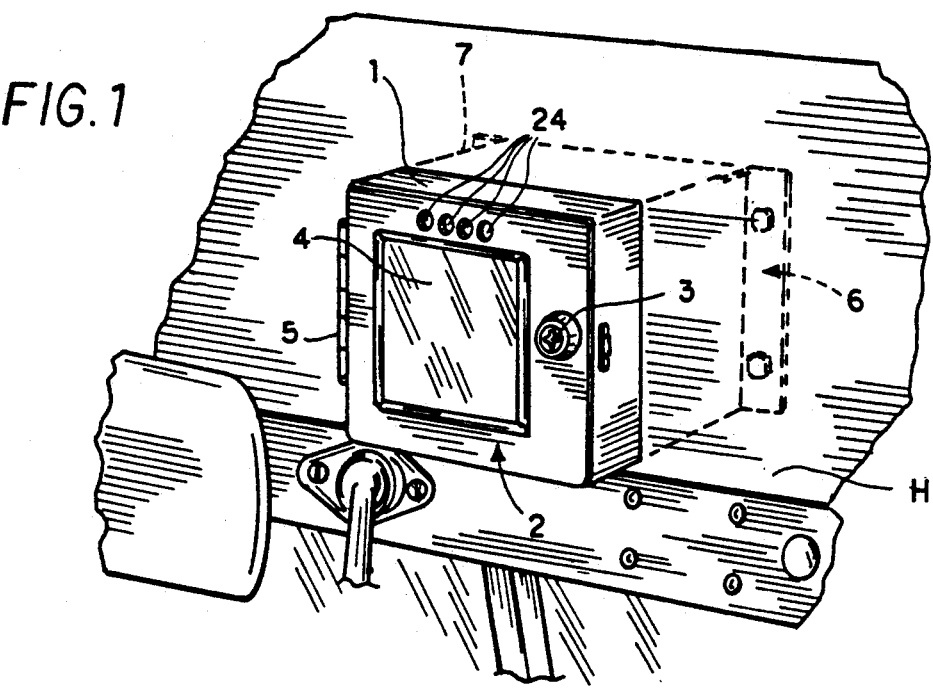
FIG. 1 is a perspective view of the box of the present invention mounted inside a bus above the driver.

FIG. 1 shows the box 1 of the present invention as it is intended to be used. The box 1 is mounted on the inside of a school bus, for example, using mounting angles 6 and 7 which may be attached to the box 1 in any conventional manner, such as by spot welding. The other faces of the mounting angles 6 and 7 are held to the wall of the bus through the use of screws or bolts 26, for example, as shown in FIG. 1. By such an arrangement the box 1 is securely and rigidly attached to the wall of the bus. While in the preferred embodiment a school bus is shown to be the vehicle in which the box 1 is mounted, box 1 may be mounted in any conventional vehicle. As further shown in FIG. 1, preferably the box 1 is mounted substantially within the header H of the bus, as indicated by dash lines, with only a small, forward portion of the box 1 (e.g., an inch or two) being exposed through the bus header H. The idea is for security purposes and to render the monitor as unobtrusive as possible.

Figure 6:
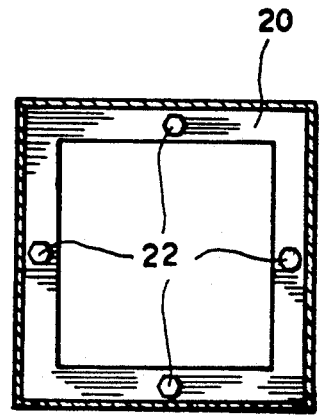
FIG. 6 is a cross-section view of the back of the camera mounting box according to a preferred embodiment of the invention.

With reference to FIG. 6, a preferred embodiment of the structure of the back of the box 1 is illustrated. A four sided mounting flange 20 is formed at the back of box 1 or may be formed separately and spot welded to the rear of the box 1. Bolts 22 or spot welding (not shown) may be used to firmly secure the box 1 to the wall of the bus. This mounting structure provides a blind mounting for box 1 for further security, so that a thief or vandal cannot access the bolts 22 to remove the invention.

Figure 2:
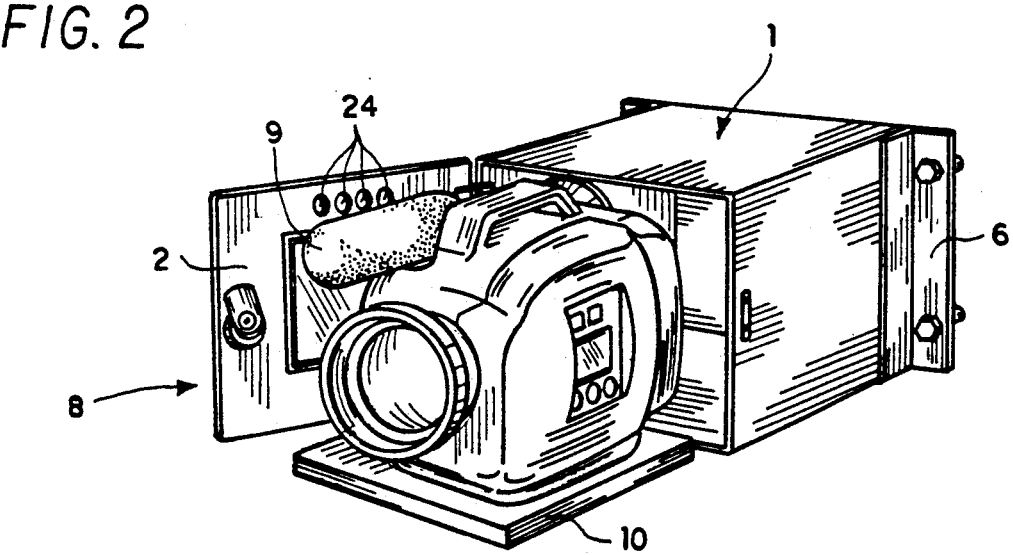
FIG. 2 is a perspective view of the box with the door open to show how the mounting base with camera is placed into and removed from the box.

Other features of the box 1 in accordance with the preferred embodiment include an open end of the box 1 in front of which a door 2 is placed so as to swing along the open end of the box 1 using door hinge 5. Door 2 can be locked shut using keylock 3. When opened, VCR/camera 8 can be removed from or placed into the box 1 easily. Before placing the VCR/camera 8 into box 1, the VCR/camera 8 is first turned on to record. As shown in FIG. 2, VCR/camera 8 is any conventional commercially available video camera such as a minicam using 8 mm cassette cartridges and operating off rechargeable batteries. Preferably, the minicam is a palmcorder, which fits neatly within the confines of a 6" by 6" by 6" box. Several such video cameras are commercially available and include, by way of example, the Panasonic PV-10 and the General Electric CG-690. Such devices are compact and portable. They generally have a microphone 9 as well as a handle and front lens. They also have a pod mounting nut at the bottom of the VCR/camera so as to be attached to and rigidly supported by a tripod.

Figure 3:
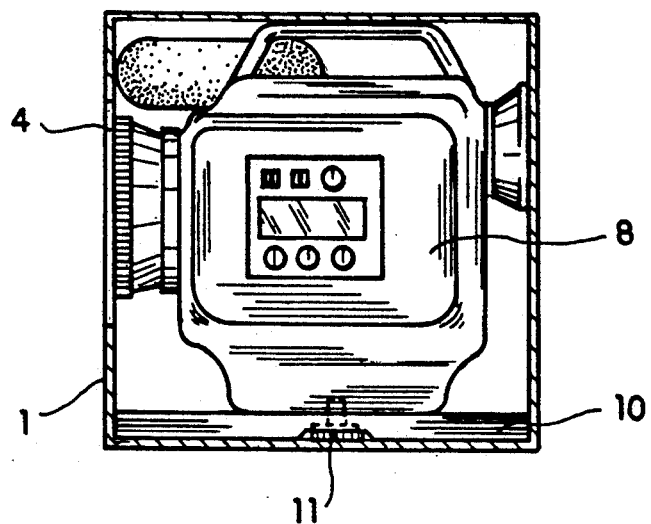
FIG. 3 is a side elevation view of the mounting base and camera with the box shown in section.

As shown in FIG. 3, this pod mounting nut is used in the present invention to mount VCR/camera 8 to a mounting base 10. Screw 11 at the bottom of mounting base 10 is used to mount VCR/camera 8 rigidly to mounting base 10 via the pod mounting nut of VCR/camera 8. Mounting base 10 fits snugly into the box 1 and rests at the bottom side of the box 1 (see FIG. 4). Such an arrangement allows for the easy placement of VCR/camera 8 into box 1 and easy removal therefrom. Once VCR/camera 8 is attached to mounting base 10 and set to record, this arrangement is placed into the box 1. A window 4 allows the VCR/camera 8 to view the passenger compartment of the bus when door 2 is closed and a series of through bores or holes 24 positioned above window 4 permit sound to pass through the door 2 and to be picked up by the recorder microphone 9 which is located immediately behind door 2 when it is closed.

Figure 4:
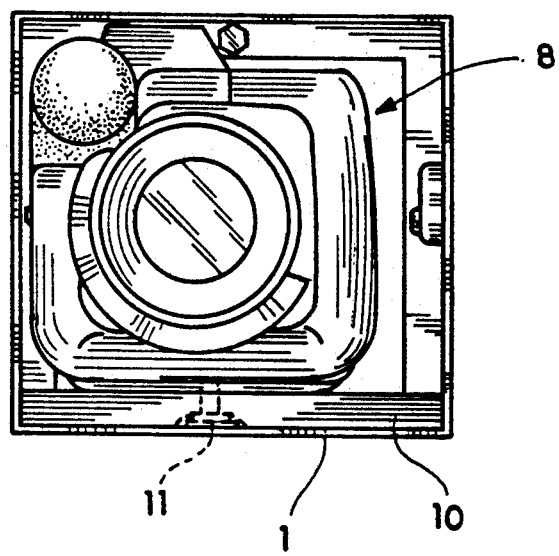
FIG. 4 is a front elevation view of the box with the door omitted to show a snug fit of the mounting base along the sides and bottom of the box.

As shown in FIG. 4, the dimensions of mounting base 10 are such that the base 10 fits snugly into box 1 so that the base 10 does not move relative to the box 1 when the door 2 is closed and locked. In one embodiment, the dimensions of the box 1 is twelve inches long by six inches high by six inches wide. The length of both the box 1 and base 10 will be dictated by the size of the VCR/camera 8, generally speaking, and can be as short as six inches when a compact minicam is used. In any event, the length and width of mounting base 10 are substantially the same as the dimensions of the box 1. Since the walls of the box 1 are thin, the length and width of mounting base 10 are slightly less the six inches. Mounting base 10 is preferably made of plexiglass, but may be made of any suitable material. The thickness of mounting base 10 is preferably a half of an inch, for example.

Figure 5:
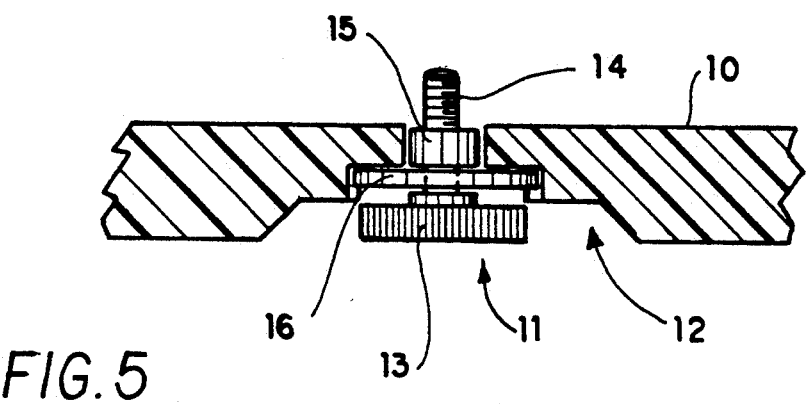
FIG. 5 is a cross-section view of the camera mounting screw in the recessed portion of the bottom of the mounting base.

FIG. 5 shows the camera mounting screw 11 at the bottom of mounting base 10. Screw 11 is located in a recessed portion 12 so that the screw 11 does not touch the bottom side of box 1 as it is being placed into or removed from box 1. The recessed portion 12 is large enough to allow the user of the device to manually manipulate the screw 11 by turning thumbwheel 13. Screw thread 14 of screw 11 is the same as those used in the conventional tripod arrangement. Screw thread 14 is standard quarter inch thread and matches the threading of the pod mounting nut. Screw 11 is securely mounted to the base 10 so as not to fall out when VCR camera 8 is not attached to the base 10. This is done through the use of a keeper ring 16 which is rigidly and securely attached to mounting base 10. Ring 16 has a hole in its center large enough so as to allow the reduced diameter middle portion of screw 11 to fit inside the hole. However, the hole is too small to allow either screw flange 15 or thumbwheel 13 to pass through it. Thus, the screw 11 is rotatably but securely mounted into the ring 16.

Although the invention has been described in detail as to the best mode of carrying out the invention, certain modifications can be made without departing from the spirit of the invention. For example, box 1 was described as being screwed into the wall of the bus so as to be rigidly and securely mounted thereto. With this arrangement the box 1 will not move relative to the passenger compartment, thus assuring steady recording by VCR camera 8. Also the theft of the box 1 is deterred. However, the box 1 could be welded to the wall of the bus to further deter the theft of the box 1. The method of securing the box 1 to the wall is a matter of choice.

It is to be understood that the present invention is not limited to the embodiments described above, but encompasses any and all embodiments within the scope of the following claims.

We claim:

1. A monitoring installation for a vehicle to enable monitoring of activity within the vehicle, comprising:
   an outer vehicle wall;
   an inner vehicle wall spaced from and parallel to said outer vehicle wall;
   an opening provided in said inner vehicle wall;
   a box having an open end and flange means on a side opposite said open end;
   said box being inserted through said opening to abut said flange means against an inner surface of said outer wall, said opening facing within the vehicle;
   means affixing said flange means and said box to said outer vehicle wall;
   a door mounted upon said box;
   hinge means attached to said door and said box to enable said door to be displaced to and from a position overlying said open end of said box;
   latch means for holding said door in said position overlying said open end of said box;
   recording monitoring means located within said box comprising;
      a base member configured to closely fit within said box; a video tape camera; and
      means connecting said video tape camera to said base member comprising;
         a threaded mounting member on said video tape camera; and
         a threaded element held on said base member by a keeper ring; whereby
         engagement between said threaded mounting member and said threaded element prevents relative movement between said video tape camera, said base member and said box; whereby
      said base member prevents said recording monitoring means from moving relative to the box when said door is in a position overlying said open end of said box; and
   monitor enabling means on said door enabling said recording monitoring means to monitor activity within the vehicle through and unimpeded by said door when displaced to a closed position overlying said open end of said box; whereby
   unauthorized access to said recording monitoring means is thwarted when said door is displaced to a position overlying said open end of said box.

2. A monitoring installation as in claim 1, said flange means extending interiorly of said box, and said affixing means includes means for securing said interiorly extending flange means to said outer vehicle wall.

3. A monitoring installation as in claim 1, said latch means comprising a key operated lock.

4. A monitoring installation as in claim 1, said monitor enabling means includes optical means enabling the passage of light waves therethrough.

5. A monitoring installation as in claim 4, said optical means comprises a solar cool glass window provided on said door.

6. A monitoring installation as in claim 1, wherein said vehicle is a school bus.

7. A monitoring installation as in claim 1, wherein said monitor enabling means includes openings through said door allowing for the passage of sound therethrough.

* * * * *